(12) United States Patent
Wowczuk et al.

(10) Patent No.: US 11,745,253 B2
(45) Date of Patent: Sep. 5, 2023

(54) SYSTEMS AND METHODS FOR PRODUCING MANUFACTURING MOLDS FOR METAL CASTING

(71) Applicant: Matthews International Corporation, Pittsburgh, PA (US)

(72) Inventors: Yurij F. Wowczuk, Pittsburgh, PA (US); Greg Geers, Pittsburgh, PA (US)

(73) Assignee: Matthews International Corporation, Pittsburgh, PA (US)

( * ) Notice: Subject to any disclaimer, the term of this patent is extended or adjusted under 35 U.S.C. 154(b) by 0 days.

(21) Appl. No.: 17/340,562

(22) Filed: Jun. 7, 2021

(65) Prior Publication Data
US 2021/0291259 A1 Sep. 23, 2021

Related U.S. Application Data

(62) Division of application No. 15/593,964, filed on May 12, 2017, now Pat. No. 11,027,329.

(60) Provisional application No. 62/335,295, filed on May 12, 2016.

(51) Int. Cl.
| | |
|---|---|
| *B22C 9/02* | (2006.01) |
| *B22C 9/22* | (2006.01) |
| *B33Y 50/00* | (2015.01) |
| *B29C 64/386* | (2017.01) |
| *B33Y 10/00* | (2015.01) |

(Continued)

(52) U.S. Cl.
CPC ............ *B22C 9/02* (2013.01); *B22C 9/22* (2013.01); *B22C 13/00* (2013.01); *B22D 25/02* (2013.01); *B29C 64/386* (2017.08); *B33Y 10/00* (2014.12); *B33Y 30/00* (2014.12); *B33Y 50/00* (2014.12); *B33Y 50/02* (2014.12); *B33Y 70/00* (2014.12); *B33Y 80/00* (2014.12); *G05B 19/4099* (2013.01); *B29L 2031/757* (2013.01); *G05B 2219/35044* (2013.01);
(Continued)

(58) Field of Classification Search
CPC .. B22C 9/02; B22C 9/22; B22C 13/00; B22D 25/02; B29C 64/386
USPC .................... 164/4.1, 6, 20, 45, 159; 700/98
See application file for complete search history.

(56) References Cited

U.S. PATENT DOCUMENTS

| 8,720,527 B1 | 5/2014 | Shepherd et al. |
| 11,027,329 B2 * | 6/2021 | Wowczuk et al. ..... B33Y 30/00 |

(Continued)

FOREIGN PATENT DOCUMENTS

WO  2017197327 A1  11/2017

OTHER PUBLICATIONS

European Search Report and Written Opinion for EP 17796978 dated Sep. 9, 2019.

(Continued)

*Primary Examiner* — Kevin P Kerns
(74) *Attorney, Agent, or Firm* — DLA Piper LLP (57) ABSTRACT

Methods and systems for creating a mold for a cast memorialization product are described herein. In a process for creating a mold, a three-dimensional (3D) model of a product design is generated. The product design includes customized features for a memorialization product. A mold design is generated based upon the 3D model of the product design. Printing instructions for creating the mold are generated and accessed by a processing device. The mold is created according to the printing instructions. A product, such as a bronze memorialization product, can be cast using the mold.

14 Claims, 7 Drawing Sheets

(51) Int. Cl.
- *B33Y 30/00* (2015.01)
- *B33Y 50/02* (2015.01)
- *B33Y 70/00* (2020.01)
- *B33Y 80/00* (2015.01)
- *B22C 13/00* (2006.01)
- *B22D 25/02* (2006.01)
- *G05B 19/4099* (2006.01)
- *B29L 31/00* (2006.01)

(52) U.S. Cl.
CPC ..... *G05B 2219/49023* (2013.01); *Y02P 80/40* (2015.11); *Y02P 90/02* (2015.11)

(56) References Cited

U.S. PATENT DOCUMENTS

| | | |
|---|---|---|
| 2004/0157527 A1 | 8/2004 | Omar |
| 2013/0220570 A1 | 8/2013 | Sears et al. |
| 2014/0277664 A1* | 9/2014 | Stump ............... G06F 30/00 700/98 |
| 2015/0251356 A1 | 9/2015 | Batchelder |
| 2015/0321246 A1 | 11/2015 | Bohra et al. |

OTHER PUBLICATIONS

ExONe Digital Part Materialization—S-Max® Furan Technical Sheet downloaded Aug. 11, 2017; http://www.exone.com/Portals/0/Systems/S-Max/X1_SMaxFuran_US.

ExOne Digital Part Materialization Printing Systems Brochure downloaded Aug. 11, 2017; http://www.exone.com/Portals/0/ResourceCenter/Literature/Printing%20Systems/ExOne_Printing_Systems_01.03_20160519_EN-EU_SCREEN.

International Search Report and Written Opinion for PCT/US2017/032509 dated Aug. 7, 2017.

Ji et al. "A New Method on Voxelizing Triangular Mesh Model" Jan. 1, 2007, Information Technology Journal, 6(8);1286-1289.

* cited by examiner

The effects of uniform slicing. (a) Original model; (b) uniformly sliced part; (c) adaptively sliced part

SYSTEMS AND METHODS FOR PRODUCING MANUFACTURING MOLDS FOR METAL CASTING

CROSS-REFERENCE TO RELATED APPLICATIONS

This application is a divisional of U.S. Pat. No. 11,027,329, filed on May 12, 2017, which claims the benefit of priority to U.S. Provisional Application No. 62/335,295, filed on May 12, 2016, entitled "Systems and Methods for Producing Manufacturing Molds for Metal Casting," each of which is hereby incorporated herein by reference in its entirety.

BACKGROUND

The present disclosure is directed to creating molds for metal casting. More particularly, the present disclosure is directed to custom mold creation using three-dimensional printing or other similar printing techniques for creating molds for metal casting.

Metal casting involves pouring liquid metal into a mold having an interior cavity shaped in the form of the desired product. The liquid metal is allowed to cool and solidify within the mold to produce a metal product corresponding to the shape of the interior cavity. Typical molding processes include sand casting, shell molding, permanent mold casting, investment casting, and die casting. Conventional techniques for creating molds involve labor-intensive and time-consuming manual processes. Bronze metal casting manufacturers often create one-of-a-kind products, such as signs, memorials, plaques, and sculptures. As such, conventional molds are typically unique forms, individually created for a specific casting. Such molds are generally only produced once and might never be used for another casting. Accordingly, the time and effort required to create the mold is a significant portion of the manufacturing costs associated with producing a bronze product. Metal product manufacturers would therefore benefit from processes capable of creating molds more efficiently.

SUMMARY

Embodiments herein are directed to various processes and methods of generating molds ("metal casting molds" or "tooling") to be used in the casting of various products, including ferrous and nonferrous plaques, markers, memorials, and other three-dimensional manifestations of designs. In an exemplary embodiment, a design concept can be communicated as a digital input, or a collection of digital inputs, and the digital input can be manipulated/modified to prepare the digital input for additive manufacturing/three-dimensional printing systems. Molds produced via additive manufacturing according to the methods disclosed herein can be made using specifications and parameters that optimize cycle time and product quality over a typical casting process involving a pattern.

Methods for creating a mold for a cast memorialization product are described herein. In certain embodiments, a method can include: generating, by a processing device, a three-dimensional (3D) model of a product design, wherein the product design includes customized features for a memorialization product; generating, by the processing device, a mold design based upon the 3D model of the product design; generating, by the processing device, printing instructions for creating the mold; accessing, by a manufacturing device, the printing instructions from the processing device; and creating, by the manufacturing device, a mold for casting the memorialization product according to the printing instructions.

In certain implementations of the above method, generating the 3D model includes: receiving, by the processing device, product design information; converting, by the processing device, polygonal information contained in the product design information to voxel information; determining, by the processing device, an acceptable resolution for the 3D model; and generating, by the processing device, the 3D model. In some examples, determining the acceptable resolution for the 3D model is based upon voxel sizes resulting from the conversion of polygonal information to voxel information.

In certain implementations of the above method, generating the mold design includes: orienting and positioning, by the processing device, the 3D model; determining, by the processing device, one or more support structures for the mold design; determining, by the processing device, one or more slicing patterns for the mold design; performing, by the processing device, path planning for the mold design; optimizing, by the processing device, the mold design; and generating, by the processing device, the mold design. In some examples, determining one or more slicing patterns comprises determining an adaptive slicing pattern for the mold design. In some examples, optimizing the mold design can include at least one of: determining a wall thickness to prevent blow out defects; determining a minimum mold height to achieve an independent and stable pour velocity; determining a pour cup strategy; and determining a venting strategy.

In certain implementations of the above method, the customized features for the memorialization product can include one or more of customized text, images, borders, and decorations.

In certain implementations of the above method, an additive manufacturing process can be used to create the mold.

In certain implementations of the above method, the additive manufacturing process can use sand to create the mold.

In certain implementations of the above method, the method can further include casting the memorialization product by adding molten metal to the created mold.

A system for creating a mold for a cast memorialization product is also described herein. The system can include a processing device, a computer readable medium operably connected to the processing device, and a manufacturing device operably connected to the processing device. The computer readable medium can include one or more instructions that, when executed, cause the processing device to: generate a three-dimensional (3D) model of a product design, wherein the product design includes customized features for a memorialization product; generate a mold design based upon the 3D model of the product design; and generate printing instructions for creating the mold. The manufacturing device can be configured to: access the printing instructions from the processing device; and create a mold for casting the memorialization product according to the printing instructions.

In certain implementations of the above system, the one or more instructions for generating the 3D model can include additional instructions that, when executed, cause the processing device to: receive product design information; convert polygonal information contained in the product design information to voxel information; determine an acceptable resolution for the 3D model; and generate the 3D model. In some examples, determining the acceptable resolution for the 3D model can be based upon voxel sizes resulting from the conversion of polygonal information to voxel information.

In certain implementations of the above system, the one or more instructions for generating the mold design can include additional instructions that, when executed, cause the processing device to: orient and position the 3D model; determine one or more support structures for the mold design; determine one or more slicing patterns for the mold design; perform path planning for the mold design; optimize the mold design; and generate the mold design. In some examples, the instructions for determining one or more slicing patterns can include additional instructions that, when executed, cause the processing device to determine an adaptive slicing pattern for the mold design.

In some examples, the instructions for optimizing the mold design can include additional instructions that, when executed, cause the processing device to determine at least one of: a wall thickness to prevent blow-out defects; a minimum mold height to achieve an independent and stable pour velocity; a pour cup strategy; and a venting strategy.

In certain implementations of the above system, the customized features for the memorialization product comprise one or more of customized text, images, borders, and decorations.

In certain implementations of the above system, the manufacturing device is configured to use an additive manufacturing process to create the mold.

In certain implementations of the above system, the additive manufacturing process uses sand to create the mold.

BRIEF DESCRIPTION OF THE DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure.

DETAILED DESCRIPTION

This disclosure is not limited to the particular systems, devices and methods described, as these may vary. The terminology used in the description is for the purpose of describing the particular versions or embodiments only, and is not intended to limit the scope.

As used in this document, the singular forms "a," "an," and "the" include plural references unless the context clearly dictates otherwise. Unless defined otherwise, all technical and scientific terms used herein have the same meanings as commonly understood by one of ordinary skill in the art. Nothing in this disclosure is to be construed as an admission that the embodiments described in this disclosure are not entitled to antedate such disclosure by virtue of prior invention. As used in this document, the term "comprising" means "including, but not limited to."

The described technology generally relates to systems, methods, and computer program products for generating molds and/or related tooling ("metal casting molds" or "tooling") for creating metal products through a metal casting process. In some embodiments, the metal casting molds can be created using additive manufacturing techniques. In some embodiments, the metal casting molds can be used in an investment casting process using ferrous and/or non-ferrous metals. The methods and systems described herein can be used with various materials, including, without limitation, ferrous metals, non-ferrous metals, bronze, precious metals, aluminum, and/or combinations thereof, and/or the like. The methods and systems described herein can be used to create various products, including plaques, markers, memorials, signs, mechanical parts, and/or the like. Molds created according to some embodiments can be used in various casting processes, including, without limitation, sand casting, shell molding, permanent mold casting, investment casting, and die casting.

In some embodiments, a mold manufacturing system ("manufacturing system") may receive a product design to be manipulated/modified using scanning technologies and/or manual data manipulation to prepare files for use with additive manufacturing and other three-dimensional printing systems. The digital input may be in the form of engineering files, such as point cloud files, polygon mesh files, spline surface files, Boolean solid geometry files, or other related computer-aided design (CAD) files, raster/vector type files, and/or the like. In some embodiments, the manufacturing system may use stereolithography (*.stl) files for use with additive manufacturing systems.

Some embodiments are directed to a method of generating a mold, the method comprising obtaining a product design through a digital input, manipulating the digital input to prepare a mold information, and making a mold from the mold information using an additive manufacturing process. In some embodiments, a method of making a cast product may comprise obtaining a product design through a digital input, manipulating the digital input to prepare the mold information, making a mold from the mold information using an additive manufacturing process, positioning the mold in a build area, forming a cast part or a cast product from the mold using a cast material; and, optionally, finishing the cast product per customer specifications. In some embodiments, one or more cast parts are needed for the cast product. In some embodiments, the digital input is manipulated/modified to optimize a mold design for the additive manufacturing process. In some embodiments, the digital input may be manipulated/modified to make a mold design by optimizing part size, dimensional depth, dimensional profile, profilometry (surface roughness/finish), strength, porosity, compaction, orientation, feature complexity, or the like. This manipulation and/or modification of the digital input can optimize the final product and/or processing characteristics across the scope of manufactured products. In some embodiments, the feature complexity may include typefaces or design aspects. In some embodiments, individual mold designs may be nested to optimize material use and production speed during the additive manufacturing process.

A variety of additive manufacturing technologies will be known to a person of skill in the art. Such technologies include, for example, binder jetting, directed energy deposition, material extrusion, material jetting, powder bed fusion, sheet lamination, and vat photopolymerization. These technologies may use a variety of materials for an additive manufacturing process, including various plastics and polymers, metals and metal alloys, ceramic materials, metal clays, organic materials, and the like. Any additive manufacturing technology and substrate suitable for the production of molds of embodiments herein and compatible with the molding of metal products, or compatible with the manufacturing of molds that may be subsequently used to mold metal products, is within the scope of the present disclosure. Likewise, other methods of additive manufacturing and associated materials, whether presently available or yet to be developed, are intended to be included within the scope of the present disclosure.

Figure 1:
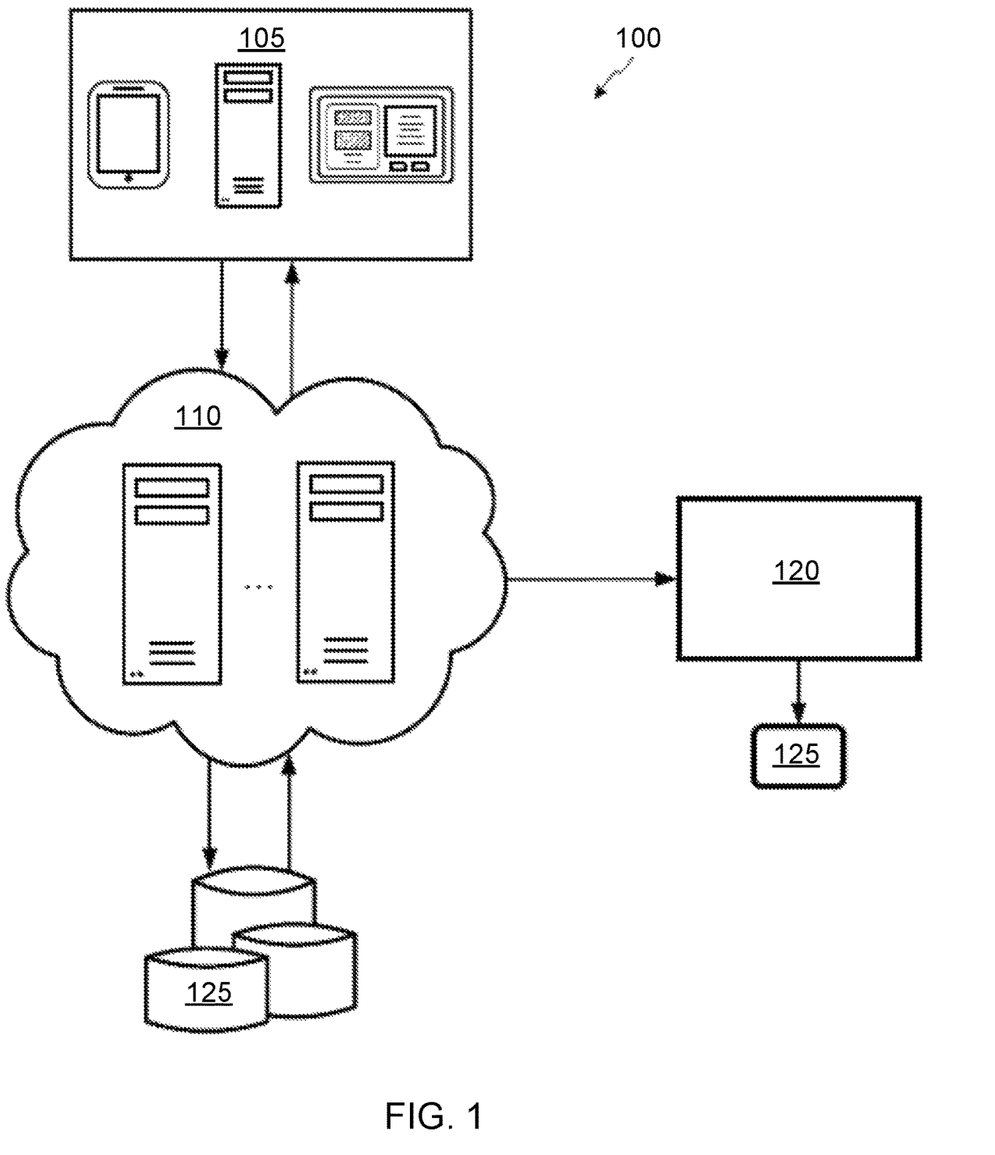
FIG. 1 depicts an illustrative manufacturing system, in accordance with one or more embodiments of the present disclosure.

FIG. 1 depicts an illustrative manufacturing system according to an embodiment. As shown in FIG. 1, the manufacturing system 100 can include one or more system logic devices 110, which can generally include a processor, a non-transitory memory or other storage device for housing programming instructions, data or information regarding one or more applications, and other hardware, including, for example, the central processing unit (CPU) 705, read only memory (ROM) 710, random access memory (RAM) 715, communication ports 770, controller 720, and/or memory device 725 depicted in FIG. 7 and described below in reference thereto. In some embodiments, the system logic devices 110 can include server computing devices, workstation computing devices (personal computers or "PCs"), and/or the like. In some embodiments, the system logic devices 110 can be a part of a control system for a mold manufacturing device 120, such as an additive manufacturing device or three-dimensional printing device.

In some embodiments, the programming instructions can include a mold manufacturing application (the "manufacturing application") configured to, among other things, design and/or generate a mold. The system logic devices 110 can be in operable communication with client logic devices 105, including, but not limited to, server computing devices, personal computers (PCs), kiosk computing devices, mobile computing devices, laptop computers, smartphones, personal digital assistants (PDAs), tablet computing devices, or any other logic and/or computing devices now known or developed in the future.

In some embodiments, the manufacturing application can be accessible through various platforms, such as a client application, a web-based application, over the Internet, an e-commerce portal, and/or a mobile application (for example, a "mobile app" or "app"). According to some embodiments, the manufacturing application can be configured to operate on each client logic device 105 and/or to operate on a system logic device 110 accessible to client logic devices over a network, such as the Internet. All or some of the files, data and/or processes (for example, source information, de-identification processes, data sets, or the like) used for accessing and/or de-identifying information can be stored locally on each client logic device 105 and/or stored in a central location and accessible over a network.

In an embodiment, one or more data stores 115 can be accessible by the client logic devices 105 and/or the system logic devices 110. In some examples, the data stores 115 can include information sources having information used to design and/or generate a mold or customized portions of molds. For example, data stores 115 can include, without limitation, information from product catalogs, historical mold information, mold pattern information (e.g., mold templates, dimensions, cost information, and/or the like), e-commerce information, production information (e.g., SKU number), material information, and/or the like. In some embodiments, the data stores 115 can include information obtained from multiple data sources, including third-party data sources.

Although the one or more data stores 115 are depicted as being separate from the logic devices 105, 110, embodiments are not so limited. All or some of the one or more data stores 115 can be stored in one or more of the logic devices 105, 110.

The system logic devices 110 can receive product specifications for a product. The product specifications can be analyzed by the manufacturing application to generate mold information. In some embodiments, the product specifications can be in the form of a digital file. The mold information can be transmitted to a manufacturing device 120, such as an additive manufacturing system. The manufacturing device 120 can generate a mold 125 based on the mold information. For example, the manufacturing application can generate, look up, or otherwise obtain information from the product specifications and translate this data into mold information that can be used by the manufacturing device 120 to generate the mold 125. In some embodiments, the mold information can be in the form of a digital file, such as an *.stl file. The mold 125 can be used in various metal casting processes to generate a product, including, without limitation, sand casting, shell molding, permanent mold casting, investment casting, and die casting.

Figure 2:
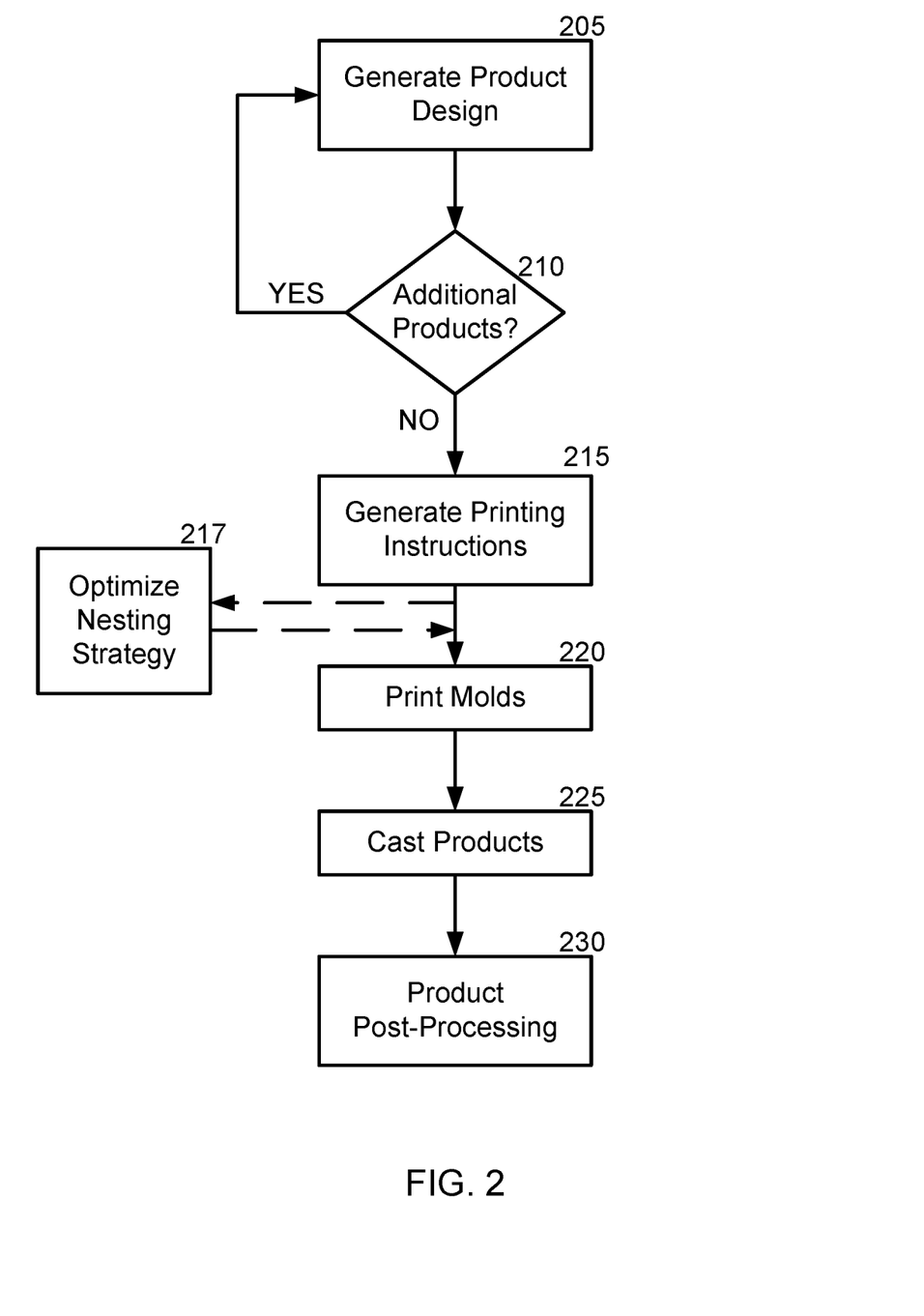
FIG. 2 depicts a flow diagram of an illustrative method for generating a mold and casting a product, in accordance with one or more embodiments of the present disclosure.

FIG. 2 depicts a flow diagram for an illustrative method for generating a mold and casting a metal product, according to one or more embodiments. The process as described in FIG. 2 can be performed, for example, by a system such as manufacturing system 100 as described above. In certain implementations, particular components in system 100 can be configured to perform various steps of the process as illustrated in FIG. 2. For example, logic devices 105, 110 can be used to generate product models and printing instructions, while manufacturing device 120 can be used to print one or more product molds.

As shown in FIG. 2, the process can include generating 205 a product design. In some embodiments, the product design may include a drawing, a sketch, a digital image, a portable document format (PDF) file, an order number, a product number, a SKU, a radio frequency identification (RFID) tag, a barcode, and/or the like. In certain embodiments, a person designing the object can have the option to design multiple products during the same molding and casting process, such as the one shown by example in FIG. 2. As such, the process can determine 210, e.g., by prompting the user, whether there are additional products to design. If there are additional products, the user can generate 205 additional product designs. When there are no additional products to design, the process can proceed.

After the product designs are generated, the system can generate 215 printing instructions for the one or more products being designed. For example, scanning technologies such as model slicing, alone or in combination with manual data manipulation, can be used to prepare a file with one or more printing instructions that can be used by additive manufacturing devices. For instance, mold printing instructions can be generated in the form of files (e.g., *.stl files) for use with three-dimensional printer devices.

Optionally, the product design and mold printing instructions can be further processed to optimize 217 a nesting strategy of the molds to be created using one or more data optimization processes. For example, data optimization 217 can include using information from e-commerce data, such as wireframes and CGI files. In another example, nesting optimization 217 may include using production data, such as part/product size information, profile and depth information, surface roughness information (e.g., profilometry), feature complexity and font information, nesting information (e.g., nesting individual mold designs to maximize material use and production speed), and/or the like. In this manner, known product information from e-commerce data and/or production information for previous products may be used to generate and/or optimize the nesting strategy.

Figure 5:
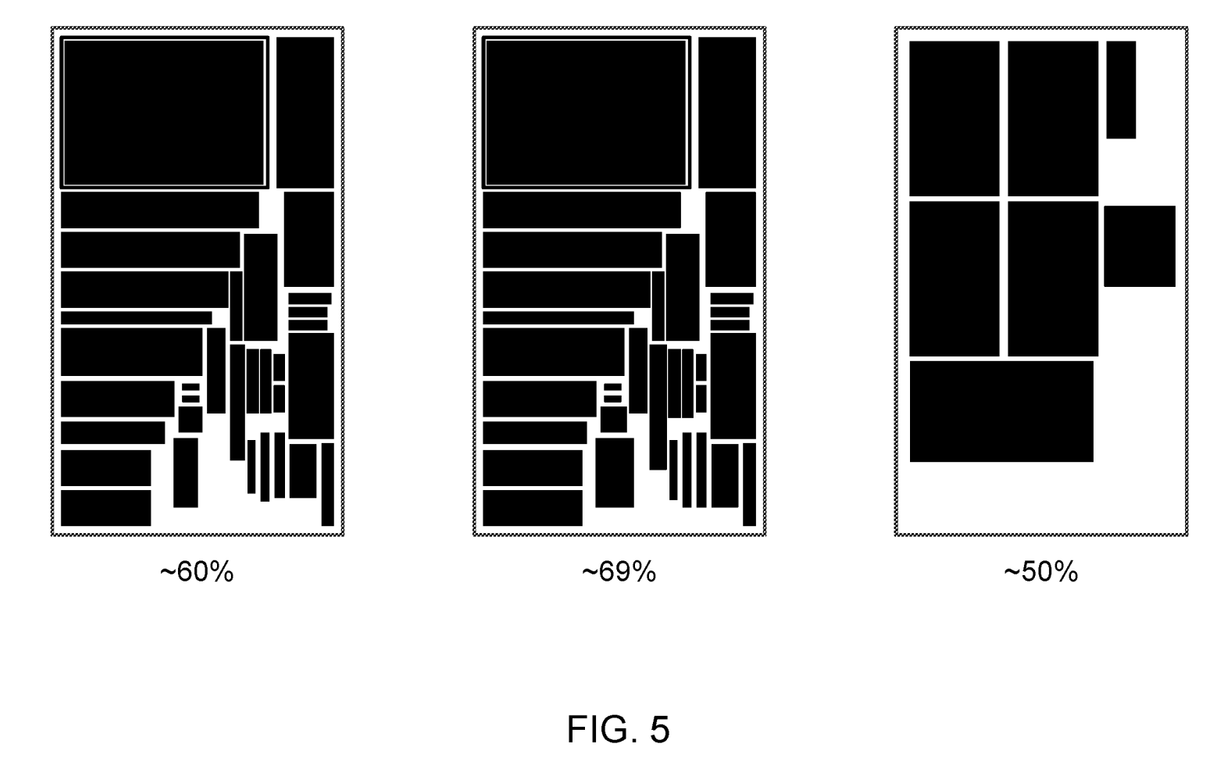
FIG. 5 depicts a sample results set of various nesting optimization techniques, in accordance with one or more embodiments of the present disclosure.

For example, as shown in FIG. 5, depending upon the capabilities of the manufacturing device, multiple designs can be nested together to maximize the amount of molds, or portions of molds, simultaneously created. As shown in FIG. 5, three different arrangements are presented, each having a different total percentage of available space used. Unless creating a single mold that is sized to the exact dimensions of the work area of the manufacturing device, using 100% of available space is unlikely because space is included between each of the molds to prevent adjacent molds from adhering to each other. However, as shown in FIG. 5, depending upon the layout, an optimized nesting strategy can use between about 50% and about 70% of the available space. However, it should be noted that the nested mold arrangements as shown in FIG. 5 are by way of example only. Depending upon the type of manufacturing being done, and any deadlines or project timelines, the amount of space used can vary. For example, if a manufacturer intends on batching a high number of product designs such that multiple molds can be simultaneously created, the amount of space used is likely to increase (e.g., 69% as shown in FIG. 5). However, if there is a rush on a particular product or design, and there are no other queued molds to be created, a single mold can be created, thus reducing the amount of space used. It should be noted that FIG. 5 is provided solely to illustrate results of a nesting strategy optimization, such as optimization 217 as shown in FIG. 2, and can vary as noted above, depending upon the type of products being molded, timelines associated with those products, and other similar criteria.

Referring again to FIG. 2, after the instructions are generated 215 (or, optionally, the nesting strategy is optimized 217), the mold(s) can be printed 220 using one or more mold generating processes. For example, the mold can be printed 220 using the mold printing instructions via an additive manufacturing process. The mold may be used as part of a metal casting process to generate a product, such as a product formed from a bronze casting process. As such, the printed mold can be removed from the manufacturing device, cleaned, and inspected for quality. The inspection can be done visually by a human, or with an optical scanning device such as a laser scanner. If the mold passes inspection, the product associated with the mold can be cast 225 using, for example, conventional casting techniques well known to those of ordinarily skill in the art. After the casting process is complete, the product can be removed from the mold and product post-processing such as cleaning, polishing, inspection, and other similar post-production tasks can be performed 230.

The process as described in FIG. 2 can be used in various industries where products are cast using customized molds. However, the techniques as described herein are particular applicable to industries where highly customizable one-off products are created. For example, memorialization services that create bronze or other similarly cast products for burial markers, urns, awards, plaques, nameplates, and other similarly customized products would benefit from the mold creation and casting techniques described herein.

The development of molds according to some embodiments provides multiple non-limiting technological advantages over conventional processes. One non-limiting technological advantage is that molds produced via additive manufacturing according to some embodiments may be made to specifications and parameters that optimize cycle time and product quality in a typical casting process, for instance, involving a casting flask and its corresponding cope and drag sections. Other non-limiting benefits may include that processes described in embodiments herein may use less material than conventional techniques, may be less labor-intensive, may result in less wasted material, and/or may expedite mold creation.

One non-limiting example of a technological advantage is dimensional stability, including the ability to generate and/or use remolds. Methods and systems according to some embodiments may provide product manufacturers with the non-limiting technological advantages of increased speed to market and/or decreased lead times, reduced or eliminated dimensional constraints, broader applicability across substrates, and the ability to recycle and/or reuse product specifications, mold information, or the actual molds themselves. The reclamation of mold materials will result in equally consistent mold quality and a cost savings. Reclamation of mold materials can be the separation of some or all of its constituents such as foundry sand or related materials, binder materials, or activator materials, or other additives that aid in the additive manufacturing process and/or the downstream processes. Successful reclamation efforts are identified as any level of reduction, reuse, or recyclability that provides an economic or other strategic advantage. In particular, the additive manufacturing process may allow for single and direct processing of molds with no post-print cure requirements.

As noted above, in the process as described in FIG. 2, key aspects include generating a product design and generating printing instructions based upon the product design. These concepts are described in detail in the discussion of FIGS. 3 and 4 below.

Figure 3:
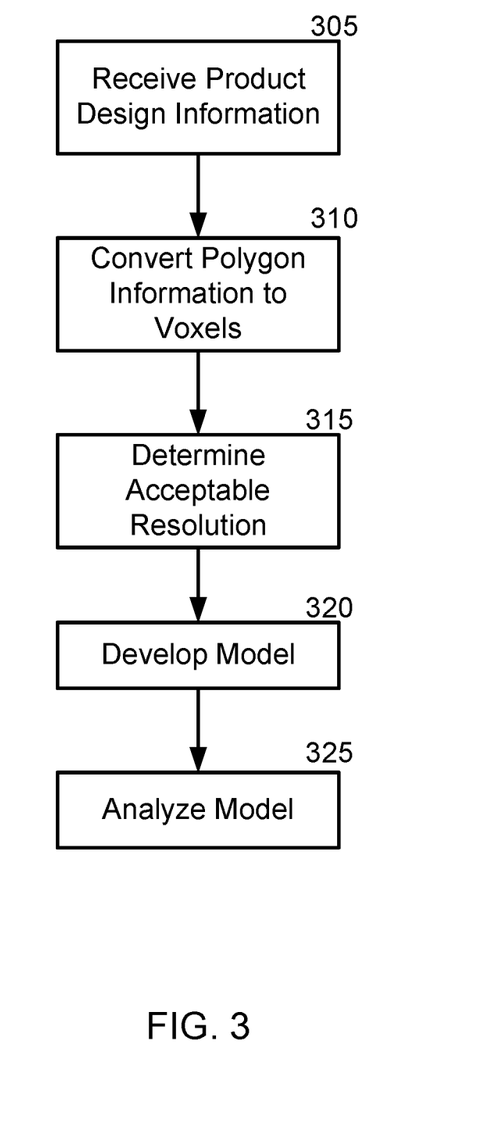
FIG. 3 depicts a flow diagram of an illustrative method for creating a model for a product to be cast, in accordance with one or more embodiments of the present disclosure.

FIG. 3 illustrates a sample flow diagram for generating a product design. For example, such a process can be incorporated into the process illustrated in FIG. 2, for example, replacing generating 205 a product design with a more detailed process.

Referring to FIG. 3, a system running a modeling application or similar software and implemented on a processing device such as logic devices 105, 110, can receive 305 product design information for a product to be modeled and cast. In certain implementations, the product design information can include a digital representation of the product such as a three-dimensional image file. In some examples, the digital representation can be loaded, created or otherwise obtained from, for example, a standard library of product files. For example, the product file can include product-specific information, such as shape, surface structure, material and associated material properties (e.g., reflectance, color, gloss, anisotrophy, scattering properties, and translucency), and other related information. In some implementations, a user can alter the standard library files to include additional detail, such as text, images, or other adornments or decorations. For example, when creating a plaque, the user can load a standard product file representing various dimensions of the plaque (i.e., length, width and depth), standard ornamentations or decorations (e.g., specific borders, raised or lowered features, and other similar decorations), and other standard features. Additionally, the user can use an interactive editing tool to add additional detail, such as text (e.g., a person's name, relevant dates, and other information related to the product being created), additional decorations (e.g., images), and any other elements that the design system is configured to support.

In order to accurately create a three-dimensional model of the product, the product design information can be initially modeled as polygonal information (e.g., a series of vector-based coordinates defining the extreme outer surfaces of the model). The polygonal information can then be converted 310 into voxel information. In computer design and modeling, voxels refer to volumetric elements, or elements that take up a definable space in a three-dimensional grid. Typically, a voxel is defined by its position relative to other voxels in a design. As a result, voxels are used to accurately represent spaces that are non-homogeneously filled more easily than polygonal information because polygons are typically only represented by a coordinate set, and not as they relate to other parts of a design. In certain implementations, converting 310 the polygonal information to voxel information can be performed on a pixel-by-pixel basis. In such an example, a pixel mask or other similar means for dividing the polygonal information can be applied to the product design information such that the product design is divided into an array of pixel-sized components. Each pixel-sized component can then be converted to voxel information using standard information and/or data conversion techniques.

During conversion 310, certain aspects and information related to the product should be maintained at a high level of accuracy (e.g., within a specific sizing and spacing threshold to the original product). As such, the model should retain depth illusion, depth compression, shape compression, silhouette collapse, object order, and other similar aspects.

Depending upon the size of the voxels (which can be dependent on, for example, the size of the pixel information used during the conversion as described above), the accuracy of the design software, and the manufacturing capabilities of the manufacturing device creating the mold, an acceptable resolution can be determined 315. For example, specific layer thicknesses and surface roughness values can be determined for a specific model. In order to accurately determine 315 the resolution, additional information, such as the size of the particulate (e.g., sand) being used to create the mold, can be considered. Based upon the size of the particulate, a certain level of resolution might not be easily achieved when creating the mold.

After the polygon information is converted 310, and the resolution is determined 315, the processing device can develop 320 the model as a 3D model file stored, for example, on a computer readable medium operably connected to the processing device. The model can then be analyzed 325 by, for example, the designer of the model. In certain implementations, the processing device can be configured to automatically analyze 325 the model to determine whether the dimensions of the model, shapes, features, text, resolution, and other related parameters and properties were properly converted and modeled.

Depending upon the number of products being cast, the process as shown in FIG. 3 can be repeated a number of times to create a digital 3D model for each such product being cast.

Figure 4:
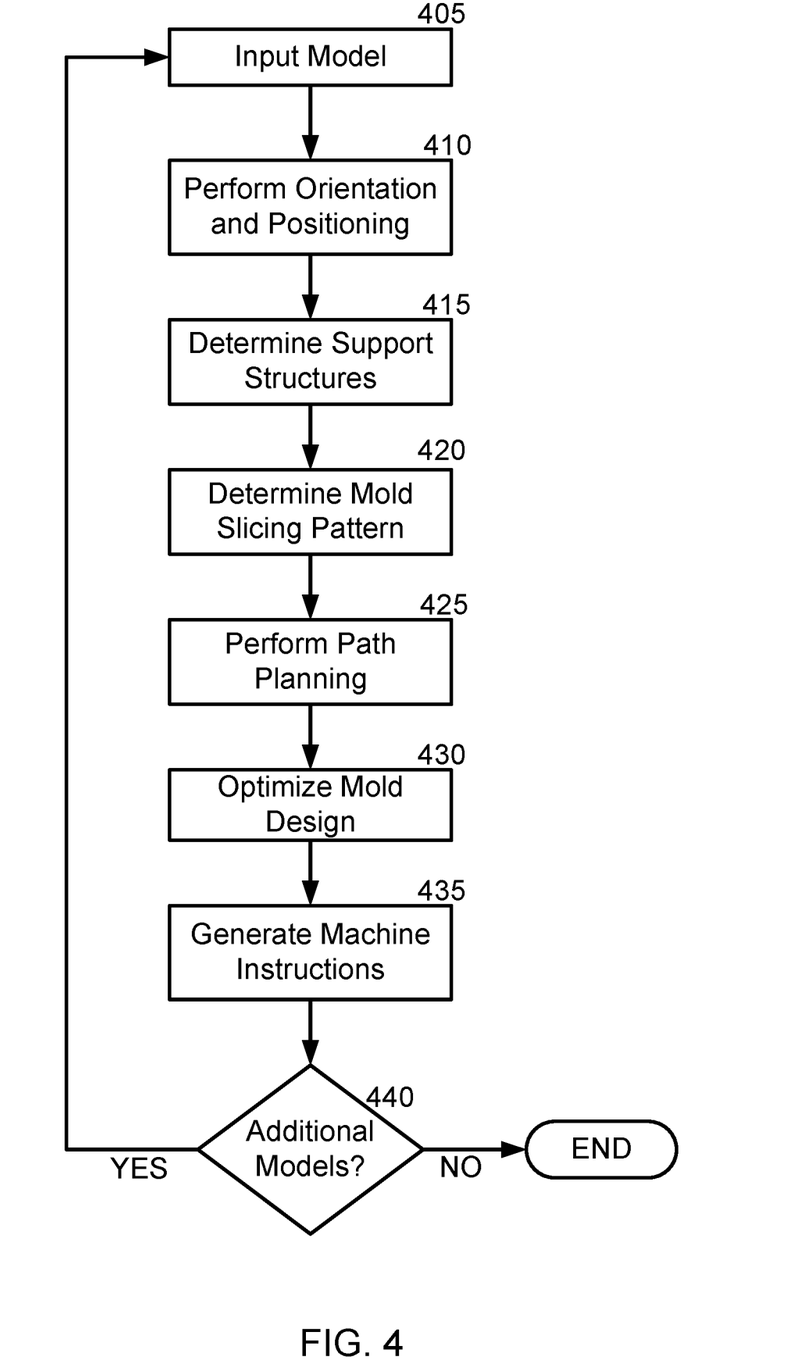
FIG. 4 depicts a flow diagram of an illustrative method for producing print instructions for printing a mold, in accordance with one or more embodiments of the present disclosure.

Once the product model has been created, a mold for casting the product can be designed. FIG. 4 illustrates a sample process for creating a mold for a specific digital product model. A processing device, such as logic devices 105, 110 as described above, or a processing device integrated into, for example, manufacturing device 120, can initially input 405 a product model. It should be noted that, when creating a mold for casting a product, the model of the product can be used as a template to create the mold. Thus, the mold is shaped as a negative of the model, defining open spaces associated with solid features of the products, and having solid spaces associated with open features of the product.

Referring again to FIG. 4, after the model is input 405 and loaded, the processing device can orient and position 410 the model such that a mold can be created representing the various features of the product being cast. In some implementations, depending upon the size and shape of the product to be cast, multiple molds or mold portions can be created and combined prior to casting. The processing device can also determine 415 any support structures that might be required for providing structural integrity to the mold during the casting process. For example, internal support and shaping structures can be determined 415 for the mold being created.

The processing device can also determine 420 a mold slicing pattern. The mold slicing pattern can be configured such that it reduces eliminated geometry and staircase effects from the additive manufacturing process. As noted above, the additive manufacturing process can use a particulate such as sand to create the mold. As such, the various features of the mold may not be perfectly smooth. Rather, they can only be as smooth as the size of the particulate being used. As such, by accurately determining 420 a mold slicing pattern, staircase effects can be reduced.

Figure 6:
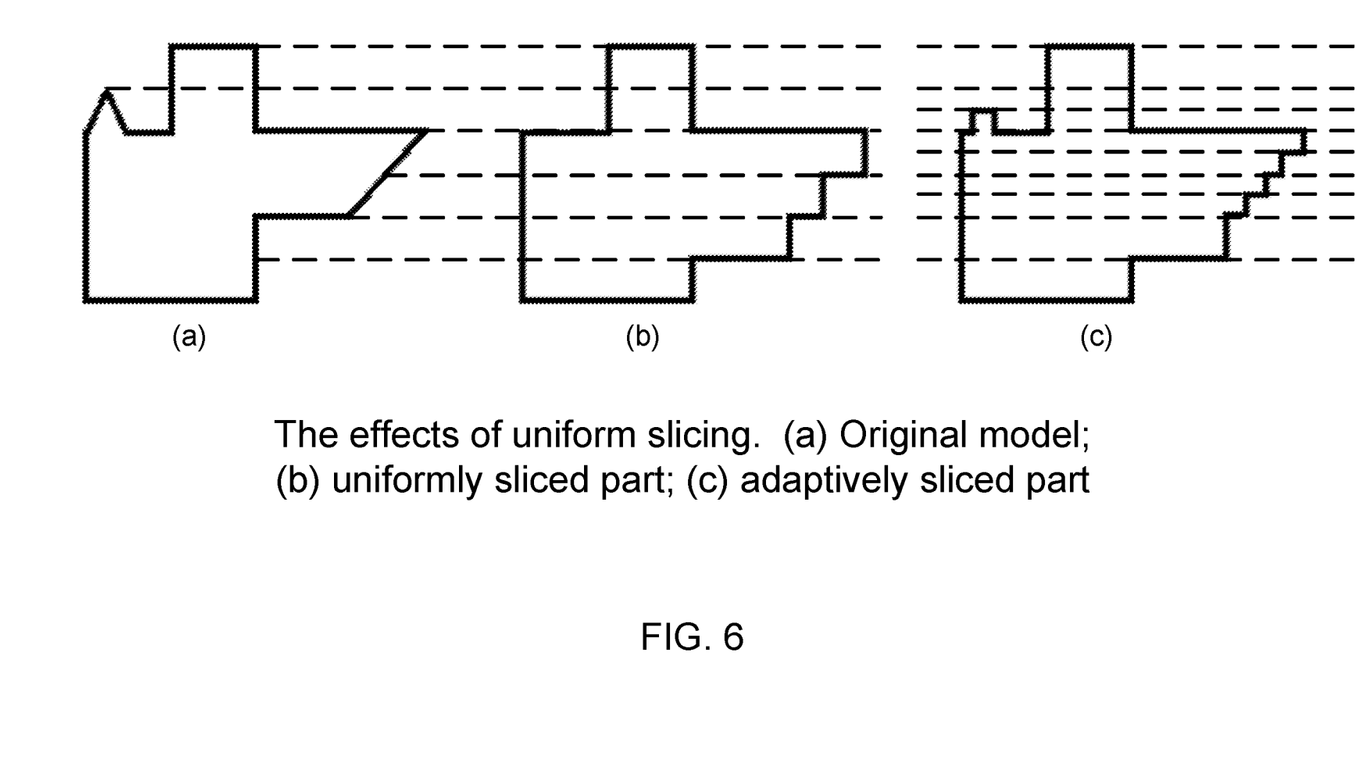
FIG. 6 depicts a sample set of slicing techniques for creating a model, in accordance with one or more embodiments of the present disclosure

For example, FIG. 6 depicts a sample illustration of slicing effects and various slicing techniques. Item (a) in FIG. 6 represents the original model, including various geometric features. Item (b) represents a uniformly sized slicing pattern. Depending upon the design of the product being cast, a uniform slicing pattern can result in an acceptable loss of quality and finish, while reducing the overall time to create the mold. Item (c) represents an adaptive slicing pattern. As illustrated, such a pattern provides a higher level of detail by narrowing the slices where appropriate, thereby increasing the total number of slices in the mold. In such an adaptive slicing pattern, more detail from the original model can be maintained as compared to, for example, the uniform slicing pattern. It should be noted that the slicing patterns shown in FIG. 6 are provided by way of example only, and additional slicing patterns can be used.

Referring again to FIG. 4, the processing device can perform 425 path planning for the mold creation process. In certain implementations, the path planning includes specific movements and instructions for causing the manufacturing device to produce the mold. Typically, manufacturing devices include optimization software for performing accurate path planning specific to the functions and capabilities of that specific manufacturing device.

The processing device can further optimize 430 the mold design. In certain implementations, optimizing 430 the mold design can include one or more of determining a wall thickness to prevent blow-out defects, determining a minimum mold height to achieve an independent and/or stable pour velocity (according to, for example, Chvorinov's Rule), determining a pour cup strategy, determining a venting strategy, and determining other optimization parameters, such as angling the mold, modifying the orientation of the mold, and other similar ideas and concepts.

The processing device can generate 435 the actual machine instructions for creating the mold and store the machine instructions on a computer readable medium operably connected to the manufacturing device for execution by the manufacturing device when creating the mold. The processing device can further determine 440 whether molds can be created for additional modeled products. If additional models exist, the process as described in FIG. 4 can be repeated for each model. If no additional models exist, the process as shown in FIG. 4 can complete.

In an embodiment, after performing the process in FIG. 4, the actual mold can be created as described above in FIG. 2. For example, an additive manufacturing process can be used to create the mold from, for example, sand or another similar particulate. After mold creation, the mold can be cleaned, inspected, and, if the mold passes quality control, the product can be cast. As the molds are typically destroyed when removing the cast product, creating a custom mold for each custom product, such as a memorialization product like a bronze plaque, can be expensive and time consuming when done one at a time by hand. However, using the process as described herein, a person can design multiple products, create instructions for creating the molds, and create the molds in a single batch process, for example, overnight, thereby reducing the amount of time a single employee spends on each product while maximizing efficiency.

Figure 7:
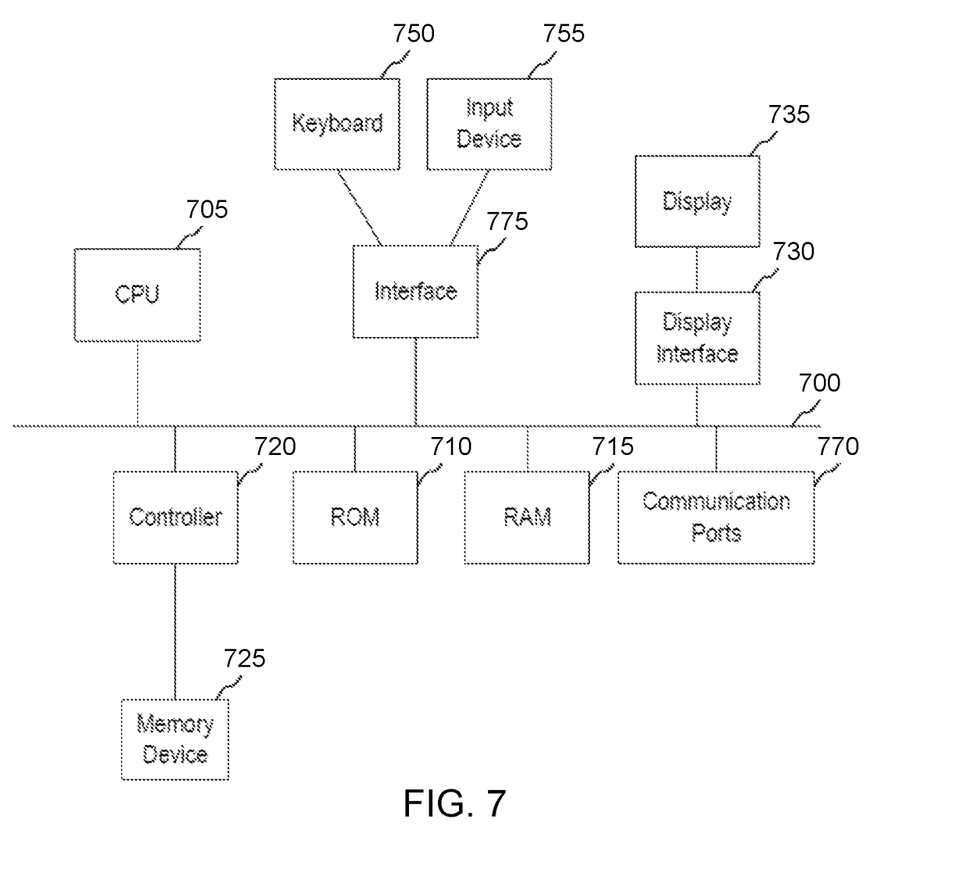
FIG. 7 illustrates various embodiments of a computing device for implementing the various methods and processes described herein.

FIG. 7 depicts a block diagram of exemplary internal hardware that may be used to contain or implement the various computer processes and systems as discussed above. In some embodiments, the exemplary internal hardware may include or may be formed as part of a PLC control system. In some embodiments, the exemplary internal hardware may include or may be formed as part of an additive manufacturing control system, such as a three-dimensional printing system. A bus 700 serves as the main information highway interconnecting the other illustrated components of the hardware. CPU 705 is the central processing unit of the system, performing calculations and logic operations required to execute a program. CPU 705 is an exemplary processing device, computing device or processor as such terms are used within this disclosure. Read only memory (ROM) 710 and random access memory (RAM) 715 constitute exemplary memory devices.

A controller 720 interfaces with one or more optional memory devices 725 via the system bus 700. These memory devices 725 may include, for example, an external or internal DVD drive, a CD ROM drive, a hard drive, flash memory, a USB drive or the like. As indicated previously, these various drives and controllers are optional devices. Additionally, the memory devices 725 may be configured to include individual files for storing any software modules or instructions, data, common files, or one or more databases for storing data.

Program instructions, software or interactive modules for performing any of the functional steps described above may be stored in the ROM 710 and/or the RAM 715. Optionally, the program instructions may be stored on a tangible computer-readable medium such as a compact disk, a digital disk, flash memory, a memory card, a USB drive, an optical disc storage medium, such as a Blu-Ray™ disc, and/or other recording medium.

An optional display interface 730 can permit information from the bus 700 to be displayed on the display 735 in audio, visual, graphic or alphanumeric format. Communication with external devices can occur using various communication ports 770. An exemplary communication port 770 can be attached to a communications network, such as the Internet or a local area network.

The hardware can also include an interface 775 which allows for receipt of data from input devices such as a keyboard 750 or other input device 755 such as a mouse, a joystick, a touch screen, a remote control, a pointing device, a video input device and/or an audio input device.

It will be appreciated that various of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art which alternatives, variations and improvements are also intended to be encompassed by the embodiments described above.

What is claimed is:

1. A system for creating a plurality of molds for one or more cast memorialization products, the system comprising:
a processing device;
a computer readable medium operably connected to the processing device, the computer readable medium comprising one or more instructions that, when executed, cause the processing device to:
generate a three-dimensional (3D) model for each of one or more product designs, wherein each product design includes customized features for a memorialization product,
generate a mold design for each product design based upon the 3D model of the product design,
generate printing instructions for creating a plurality of mold portions rising the mold design for each product design, and
optimize the printing instructions for the plurality of mold portions according to a nesting strategy, thereby generating nested printing instructions; and
a manufacturing device operably connected to the processing device and configured to:
access the nested printing instructions from the processing device, and
create the plurality of mold portions for casting each memorialization product according to the nested printing instructions.

2. The system of claim 1, wherein the one or more instructions that cause the processing device to generate the 3D model comprise additional instructions that, when executed, cause the processing device to:

receive product design information containing polygonal information;

convert the polygonal information to voxel information;

determine an acceptable resolution for the 3D model; and generate the 3D model.

3. The system of claim 2, wherein the additional instructions, when executed, further cause the processing device to determine the acceptable resolution for the 3D model based upon voxel sizes resulting from the conversion of the polygonal information to the voxel information.

4. The system of claim 1, wherein the one or more instructions that cause the processing device to generate the mold design comprise additional instructions that, when executed, cause the processing device to:

orient and position the 3D model;

determine one or more support structures for the mold design;

determine one or more slicing patterns for the mold design;

perform path planning for the mold design;

optimize the mold design; and generate the mold design.

5. The system of claim 4, wherein the additional instructions that cause the processing device to determine one or more slicing patterns comprise instructions that, when executed, cause the processing device to determine an adaptive slicing pattern for the mold design.

6. The system of claim 4, wherein the additional instructions that cause the processing device to optimize the mold design comprise additional instructions that, when executed, cause the processing device to perform at least one of:

determine a wall thickness to prevent blow-out defects;

determine a minimum mold height to achieve an independent and stable pour velocity;

determine a pour cup strategy; and determine a venting strategy.

7. The system of claim 1, wherein the customized features for the memorialization product comprise one or more of customized text, images, borders, and decorations.

8. The system of claim 1, wherein the manufacturing device is configured to create the mold using an additive manufacturing process.

9. The system of claim 8, wherein the additive manufacturing process uses sand to create the mold.

10. The system of claim 1, wherein the instructions that cause the processing device to optimize the printing instructions for each mold according to a nesting strategy comprise additional instructions that, when executed, cause the processing device to nest each mold design for the one or more product designs within a single work area.

11. The system of claim 10, wherein the additional instructions that cause the processing device to nest each mold design comprise instructions that, when executed, cause the processing device to nest each mold design within the work area to optimize one or more of material usage and production speed.

12. The system of claim 1, wherein the instructions that cause the processing device to optimize the printing instructions comprise additional instructions that, when executed, cause the processing device to optimize the printing instructions based on one or more of sizing information, profile information, depth information, surface roughness information, feature complexity information, and font information.

13. The system of claim 1, wherein the one or more product designs comprise a plurality of product designs.

14. The system of claim 13, wherein the manufacturing device is configured to create the mold associated with each of the plurality of product designs simultaneously in a single batch process.

* * * * *